Figure 1:
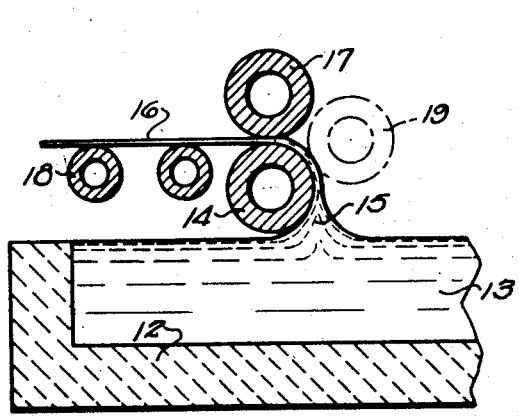

Jan. 24, 1933. J. C. BLAIR 1,895,365
METHOD AND APPARATUS FOR PRODUCING SHEET GLASS
Original Filed Feb. 6, 1925

Inventor
James C. Blair.
By Frank Fraser,
Attorney

Patented Jan. 24, 1933

1,895,365

UNITED STATES PATENT OFFICE

JAMES C. BLAIR, OF TOLEDO, OHIO, ASSIGNOR TO LIBBEY-OWENS-FORD GLASS COMPANY, OF TOLEDO, OHIO, A CORPORATION OF OHIO

METHOD AND APPARATUS FOR PRODUCING SHEET GLASS

Original application filed February 6, 1925, Serial No. 7,251. Divided and this application filed January 8, 1930. Serial No. 419,271.

The present invention relates to a method and apparatus for producing sheet glass, and has particular reference to producing a sheet of glass having a definite and uniform thickness. This application constitutes a division of my copending application for a method and apparatus for reducing a sheet to thickness, filed Feb. 6, 1925, Serial No. 7,251.

In the general type of machine as described in the patent to I. W. Colburn, 1,248,809, granted Dec. 4, 1917, a sheet of glass is continuously drawn upwardly from a mass of molten glass for a suitable distance, and then deflected over a so-called bending roll so that the sheet may be run in a horizontal plane over a flattening table and through a suitable annealing leer. The thickness of the sheet produced in the Colburn apparatus is determined to a large extent by the rapidity with which the drawing apparatus is operated. Thus, when the apparatus is operated relatively fast, a thin sheet is produced and viceversa, when operated slowly, a thicker sheet is produced. The thickness of sheet produced is also dependent upon the temperature and viscosity of the glass. The uniformity of the thickness of sheet is dependent to a considerable degree upon the skill of the operator as no means is provided for actually rolling or otherwise mechanically forming or reducing the sheet to a predetermined and uniform thickness. By careful handling of the Colburn machine, an exceptionally good quality of glass can be produced, particularly for ordinary sheet glass uses. However, it is almost impossible to constantly produce a sheet of absolutely uniform thickness with a single roll such as is used in the Colburn machine.

In accordance with the present invention, a machine has been developed capable of constantly producing a flat sheet of substantially predetermined thickness which is uniform throughout. A sheet of glass which is of uniform thickness and perfectly flat is extremely desirable as a blank for the production of ground and polished glass, usually called plate glass. The flatter and more uniform the thickness of a plate glass blank, the less amount of time is required to grind the same preparatory to polishing, and obviously the shorter the time required for grinding, the smaller will be the cost of the finished plate. Also, when the blank is flat and of a uniform thickness, it is possible to start the grinding operation with a thinner blank than if it were not flat or uniform in thickness.

An important object of the invention is to provide a method and apparatus wherein what may be termed an unformed mass or body of glass is moved or drawn upwardly from a molten bath and reduced to a sheet of substantially predetermined and uniform thickness.

Another object of the invention is to provide means above a mass of molten glass for creating a sheet forming pass adapted for continuously drawing a relatively thick body of glass from said mass, said body of glass being moved through the sheet forming pass where it is reduced to a sheet having substantially a predetermined thickness.

Another object of the invention is to provide means of the above described character including a pair of rotatable members arranged above the molten bath for drawing a mass or body of glass upwardly therefrom and reducing or rolling it to a sheet of uniform thickness and flatness, said members being spaced from one another to create a sheet forming pass for finally sizing the sheet and one member acting as a bending member about which the glass is deflected from the vertical into a substantially horizontal plane.

Still another object of the invention is to provide means of the above character including a rotatable member positioned above a supply body of molten glass at substantially the surface thereof and acting to move a mass of molten glass upwardly from said supply body, and a second rotatable member cooperating with the first member to reduce the mass of glass to a sheet of substantially predetermined and uniform thickness, said second member being preferably movably mounted so that it may be swung about the axis of the first member to a position either in vertical alignment therewith, horizontal alignment, or any intermediate position.

A still further object of the invention is to provide means for producing a uniform, flat and smooth sheet of glass which may be particularly well adapted for use as a blank for plate glass purposes.

Other objects and advantages of the invention will become more apparent during the course of the following description when taken in connection with the accompanying drawing.

Figure 2:
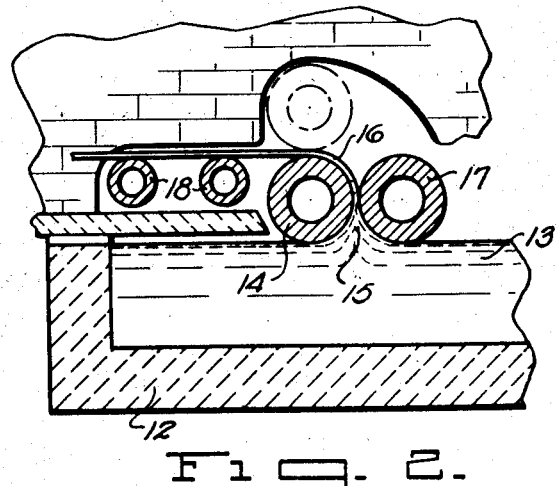
Figure 3:
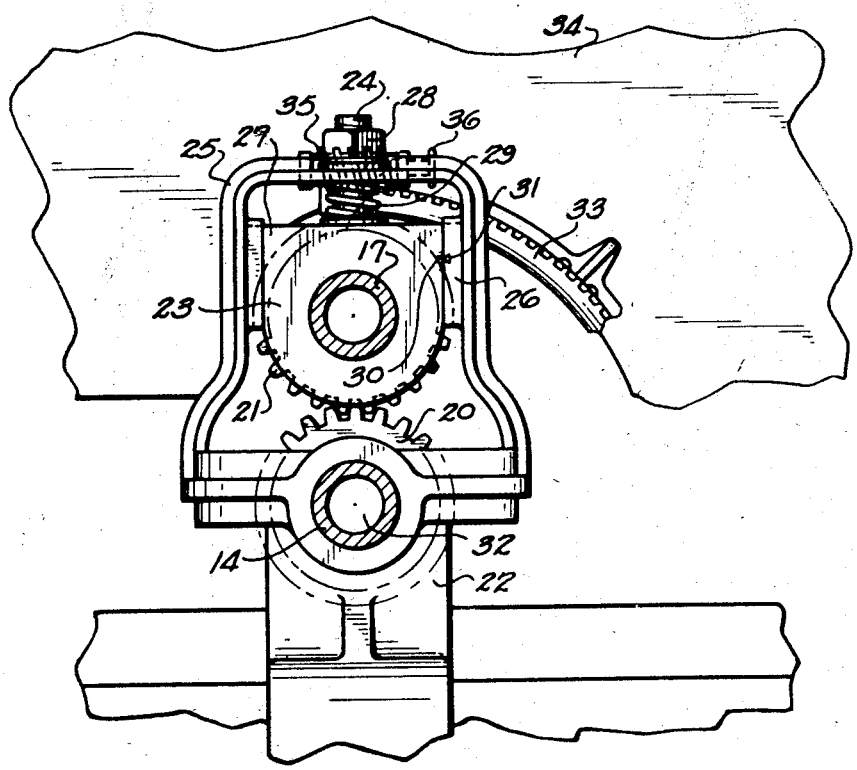

In the drawing forming a part of this application and wherein like numerals are employed to designate like parts throughout the same, Fig. 1 is a fragmentary vertical longitudinal section through apparatus provided by the present invention, Fig. 2 is a similar view showing a slightly different arrangement, and Fig. 3 is an end view showing one form of mounting the supplementary roll used to iron or roll the sheet to the desired thickness.

Referring now to the drawing and particularly with reference to Fig. 1, the numeral 12 designates a drawing or working receptacle or pot containing the source or bath of molten glass 13 supplied to said receptacle from a suitable furnace (not shown). Positioned above the working receptacle 12 is a forming roll 14. The roll 14 is disposed very close to the surface of the glass from which the sheet is drawn, thus permitting the sheet supplying meniscus or body of glass 15 to be carried upwardly by the roll as is shown, thus feeding sufficient glass from which the sheet 16 is drawn. The roll 14 is positioned substantially at the surface of the molten bath 13 and may be arranged either as shown in Fig. 1 or as illustrated in Fig. 2. In both cases, the roll 14 is located substantially at the surface of the mass of molten glass 13. The roll 14 functions to draw or move the relatively heavy and what I term an unformed mass or body of glass 15 upwardly from the molten bath and is so positioned as to contact therewith. The unformed body of glass 15 constitutes a sheet supplying meniscus and the glass is deflected about the roll 14 into substantially the horizontal plane so that this roll may also be termed a bending roll as well as a forming roll since it functions as both.

Associated with the roll 14 is a supplementary or ironing roll 17 arranged in a manner that the glass is required to pass between the bending roll 14 and the supplementary or ironing roll 17. The two rolls 14 and 17 thus form a sheet forming pass. This sheet forming pass acts to finally size the sheet.

In operation, the pot or container 12 is preferably continuously supplied with a mass of molten glass. Arranged above the molten glass is a plurality of rotatable members such as the rolls 14 and 17 which may be positively driven or idled as desired and which create a sheet forming pass. Upon rotation of the roll 14, the unformed mass or body of glass 15 is drawn or moved upwardly thereby from the molten bath 13 and delivered to the sheet forming pass between the rolls 14 and 17. The roll 17, cooperating with the roll 14, serves to reduce this unformed mass or body to a sheet of substantially predetermined and uniform thickness as shown at 16, said sheet being supported and carried along upon a plurality of rolls 18 or other suitable conveying mechanism. As disclosed, the glass is deflected about the roll 14 from the vertical into a substantially horizontal plane. The sheet thus formed is uniform in thickness and is well adapted for use as a plate glass blank, in which case the surfaces thereof are ground and polished. It will thus be seen that the body of glass is relatively thicker before it passes through said sheet forming rolls than afterwards.

The roll 17 prevents any excess glass from passing into the sheet and insures that an absolute flat and uniform sheet will be produced having a predetermined thickness. The supplementary roll 17 may be mounted in any position relative to the vertical axis or longitudinal axis of the bending roll as is indicated by the dotted lines 19. In other words, the reducing roll 17 may be positioned either in vertical alignment with the roll 14, as shown in Fig. 1, in horizontal alignment therewith as in Fig. 2, or it can be located at any intermediate position, such as for example at the position indicated at 19.

The ironing roll or reducing roll 17 may be mounted as shown in Fig. 3 wherein the bending roll 14 is provided with a gear 20 similar to a gear 21 carried by the supplementary roll and in mesh therewith. The teeth of the gears 30 and 31 are sufficiently long to permit relative adjustment between the two so that the rolls 14 and 17 may be moved to and from each other depending upon the thickness of sheet required. The bending roll 14 is ordinarily permitted to idle in its bearings 22 and is rotated by the sheet being drawn. In cases of emergency or when starting the sheet, the bending roll 14 is positively driven and the supplementary roll 17 driven therefrom.

The roll 17 is supported in a movable bearing support 23 having connection with the screw threaded shaft 24 operable through the stationary support or bracket 25. The bracket 25 is provided with guide ways 26 between which are disposed slides 27 carried by the bearing 23. This permits the bearing 23 to be moved up and down or to and from the bending roll shaft. A suitable screw adjusting means 28 is provided for moving the bearing up and down while a safety spring 29 is provided for permitting the supplementary roll to be moved away from the bending roll in the event a piece of clay or other foreign matter is carried up by the sheet. The spring is, however, sufficiently strong to hold the ironing roll 17 in its adjustment when no foreign matters are present. Suitable graduations 30 and an index mark 31 are provided to make it possible to ascertain the exact adjustment of the roll 17 with respect to the bending roll. The bracket 25 is preferably rotatably mounted about the shaft 32 so that it can be swung from a vertical position to a horizontal position. A segmental rack 33 is carried by the frame 34 and has engagement with a worm 35 operable by means of the handle 36 by which means the roll 17 and its support can be moved to the desired adjustment.

This type of apparatus is particularly well adapted for producing a sheet of glass suitable for plate glass purposes and will reduce the amount of grinding and polishing to a minimum as the blank itself is absolutely uniform and flat.

Of course, in those cases where the sheet is to be cut up and used as plate glass, it is desirable to make the blanks slightly larger than the thickness of the desired finished sheet to allow for the removal of a small amount of glass during the surfacing operations.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In sheet glass apparatus, a receptacle containing a bath of molten glass, and a plurality of rotatable imperforate members arranged above said bath for drawing an unformed mass or body of molten glass upwardly from the molten bath which is unconfined in the region of draw and reducing it to a sheet of final predetermined and uniform thickness, one of said rotatable members being positioned substantially at the surface of said molten bath.

2. In sheet glass apparatus, a receptacle containing a bath of molten glass, and a plurality of rotatable imperforate members arranged above said bath for drawing an unformed mass or body of molten glass upwardly from the molten bath which is unconfined in the region of draw and reducing it to a sheet of final predetermined and uniform thickness, at least one of said members being positioned to contact with the base or meniscus of the unformed mass or body of glass as it is drawn upwardly.

3. In sheet glass apparatus, a receptacle containing a bath of molten glass, and a plurality of rotatable imperforate members arranged above said bath for drawing an unformed mass or body of molten glass upwardly from the molten bath which is unconfined in the region of draw and reducing it to a sheet of final predetermined and uniform thickness, at least one of said members being positioned substantially at the surface of the molten bath and arranged to contact with the base or meniscus of the unformed body or mass as it is drawn upwardly.

4. In sheet glass apparatus, a receptacle containing a bath of molten glass, and a plurality of rotatable members arranged above said bath and spaced from one another to create a sheet forming pass therebetween, said members functioning to draw a relatively heavy unformed mass or body of molten glass upwardly from the molten bath and reduce it to a sheet of final predetermined and uniform thickness, with one of said members being positioned substantially at the surface of the molten bath and acting as a bending member for changing the glass from the vertical into a substantially horizontal plane.

5. In sheet glass apparatus, a receptacle containing a bath of molten glass, and a plurality of rotatable members arranged above said bath and spaced from one another to create a sheet forming pass therebetween, said members functioning to draw a relatively heavy unformed mass or body of molten glass upwardly from the molten bath and reduce it to a sheet of final predetermined and uniform thickness, with one of said members being positioned to contact with the base or meniscus of the upwardly moving body of glass and also acting as a bending member for changing the glass from the vertical into a substantially horizontal plane.

6. In sheet glass apparatus, a receptacle containing a bath of molten glass, a roll positioned above the molten bath for moving a relatively heavy unformed mass or body of molten glass upwardly therefrom, and a second roll located in cooperating position with respect to the first roll to establish a sheet forming pass for finally sizing the sheet, said second roll being adjustable around the axis of the first roll.

7. In sheet glass apparatus, a receptacle containing a bath of molten glass, a roll positioned above the molten bath substantially at the surface thereof for moving a relatively heavy unformed mass or body of molten glass upwardly therefrom and acting as a bending roll for changing the glass from the vertical into a substantially horizontal plane, and a second roll located in cooperating position with respect to the first roll to establish a sheet forming pass for finally sizing the sheet, said second roll being adjustable around the axis of the first roll.

8. The method of forming sheet glass, which consists in moving a relatively heavy, unformed mass or body of glass upwardly from a molten bath, passing said unformed body in contact with a movable surface, in reducing said body while in engagement with said surface to a sheet of final predetermined thickness, and in then changing the direction of travel of the glass about said surface from the vertical to the horizontal.

9. The method of forming sheet glass, which consists in moving a relatively heavy, unformed mass or body of glass upwardly from a molten bath, passing said unformed body in contact with a movable surface, in then passing said glass through a sheet forming pass defined by said movable surface and a second movable surface to reduce the glass to a sheet of final predetermined thickness, and in changing the direction of travel of the glass about the first movable surface from the vertical to the horizontal.

10. The method of forming sheet glass, which consists in moving a relatively heavy, unformed mass or body of glass upwardly in contact with a moving surface, in then bringing into engagement with said unformed body while in contact with said surface a second movable surface for finally sizing the sheet, and in changing the direction of travel of the glass about the first mentioned surface from the vertical to the horizontal.

11. In sheet glass apparatus, a receptacle containing a mass of molten glass, a pair of rolls adjacent to the surface thereof and arranged to create a sheet forming pass, means for rotating the rolls so that an unformed mass of glass is advanced to said pass and there reduced to a sheet having substantially a predetermined thickness, said sheet being deflected over one of said rolls into the horizontal, and means for carrying the sheet laterally away from said roll.

12. The method of forming sheet glass which consists in moving a relatively heavy unformed mass or body of glass from a molten bath upwardly and in contact with a movable surface contiguous to the upper surface of the glass, in reducing said body while in engagement with said movable surface to a sheet of final predetermined thickness, and in then deflecting the formed sheet before it has been materially extended in a direction different from the path of travel of the unformed mass.

13. The method of forming sheet glass which consists in moving a relatively heavy unformed mass or body of glass upwardly from a molten bath with the base or meniscus thereof in contact with a movable surface, reducing said body while in engagement with said surface to a sheet of final predetermined thickness, and in then deflecting the formed sheet in the region of said surface in a direction different from the path of travel of the unformed mass.

14. The method of forming sheet glass which consists in moving the base or meniscus of a relatively heavy unformed mass or body of glass upwardly from a molten bath in contact with a movable surface, reducing said body while in engagement with said surface to a sheet of final predetermined thickness, and in then subsequently deflecting the formed sheet in a direction different from the path of travel of the unformed mass.

Signed at Toledo, in the county of Lucas, and State of Ohio, this 4th day of January, 1930.

JAMES C. BLAIR.